United States Patent
Yu et al.

(10) Patent No.: US 6,840,270 B2
(45) Date of Patent: Jan. 11, 2005

(54) LOW DEVIATION PRESSURE RELIEF VALVE FOR FUEL PUMPS

(75) Inventors: DeQuan Yu, Ann Arbor, MI (US); Stephen T. Kempfer, Canton, MI (US); Christopher C. Lobombarbe, Ypsilanti, MI (US); David J. Rink, Ann Arbor, MI (US); David M. Dokas, Ann Arbor, MI (US); Paul E. Fisher, Dexter, MI (US); Jeff Moll, Whitmore Lake, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/267,479

(22) Filed: Oct. 9, 2002

(65) Prior Publication Data
US 2004/0069351 A1 Apr. 15, 2004

(51) Int. Cl.[7] ............................................. F16K 15/04
(52) U.S. Cl. ............. 137/539; 137/533.19; 137/543.19; 251/333; 251/359
(58) Field of Search ........................ 137/454.4, 543.17, 137/454.2, 454.5, 533.19, 539, 539.5, 543.19; 251/333, 337, 359

(56) References Cited

U.S. PATENT DOCUMENTS

| | | | | |
|---|---|---|---|---|
| 619,705 A | * | 2/1899 | Knupp | 417/549 |
| 2,761,468 A | | 9/1956 | Thatcher | |
| 3,219,057 A | * | 11/1965 | Knowles | 137/539 |
| 3,235,098 A | * | 2/1966 | Emrick | 414/676 |
| 3,346,009 A | | 10/1967 | Lindeboom | |
| 3,400,440 A | * | 9/1968 | Carlson | 29/890.121 |
| 3,421,547 A | * | 1/1969 | Aslan | 137/539 |
| 3,894,556 A | | 7/1975 | Pareja | |
| 4,044,746 A | | 8/1977 | Kaye | |
| 4,084,304 A | * | 4/1978 | Myers | 29/890.122 |
| 4,360,161 A | * | 11/1982 | Claxton et al. | 239/463 |
| 4,365,648 A | | 12/1982 | Grothe | |
| 4,379,470 A | | 4/1983 | Reutter | |
| 4,503,885 A | | 3/1985 | Hall | |
| 4,700,741 A | | 10/1987 | Murphy | |
| 4,893,650 A | * | 1/1990 | Chisholm et al. | 137/539 |
| 4,995,346 A | * | 2/1991 | Hudson, Jr. | 123/41.35 |
| 5,065,790 A | | 11/1991 | Kornas | |
| 5,107,890 A | * | 4/1992 | Gute | 137/539 |
| 5,509,444 A | * | 4/1996 | Robinson et al. | 137/508 |
| 5,522,346 A | * | 6/1996 | Clark, IV | 119/72.5 |
| 5,560,343 A | | 10/1996 | Werkmann et al. | |
| 5,651,383 A | * | 7/1997 | Ekman | 137/1 |
| 5,725,013 A | * | 3/1998 | Premiski et al. | 137/454.2 |
| 5,950,669 A | | 9/1999 | Fehlmann et al. | |
| 6,209,527 B1 | | 4/2001 | Bueser et al. | |

FOREIGN PATENT DOCUMENTS

| | | |
|---|---|---|
| CH | 197057 | 4/1938 |
| DE | 10022275 A | 12/2000 |
| GB | 2031117 A | 4/1980 |
| WO | WO 02/25148 A1 | 3/2002 |

* cited by examiner

Primary Examiner—Ramesh Krishnamurthy
(74) Attorney, Agent, or Firm—Brinks Hofer Gilson & Lione

(57) ABSTRACT

A low deviation pressure relief valve for a fuel pump consisting of a housing having an elongated bore having a continuous wall, an axis, shoulders arranged on the wall so as to extend toward the axis. A ball in the housing has a diameter at least less than the diameter of the bore and a ball retainer located in the bore upstream from the shoulders forms a ball seat by pre-coining process. The ball is smaller than the retainer seat in diameter to ensure an edge seal with the ball. A spring coaxial with the axis located down stream from the ball retainer and supported on the shoulders, and the ball is located between the spring and the ball seat wherein low flow restriction is created and reduced pressure variation is created as fluid flows past the ball and less buckling in the spring is created by guide ribs.

16 Claims, 3 Drawing Sheets

LOW DEVIATION PRESSURE RELIEF VALVE FOR FUEL PUMPS

TECHNICAL FIELD

This invention relates generally to a low deviation pressure relief valve for a fuel pump. The dead head pressure variation for newer higher flow applications in vehicles are met by this invention.

SUMMARY OF THE INVENTION

In this invention, a smaller ball in the valve creates less low flow restriction. Less flow restriction causes reduced pressure variation as the fuel flows past the ball. In the present relief valve, the various parts add up to less buckling in the spring so as to achieve less force variation. With less force variation comes less cracking pressure variation. This creates a more uniform dead head pressure. The pre-coining process is used to create a retainer seat for the ball. The ball is smaller than the retainer seat in diameter to ensure an edge seal with the ball. With an edge seal condition comes a more consistent seal and therefore a more consistent cracking pressure. This creates a more uniform dead head pressure.

Guide ribs are provided on the inside of the bore to prevent undue buckling of the spring. The ribs also prevent the ball from deviating too much from the seat centerline. This ensures more consistent sealing time and prevents the ball from becoming stuck off the seat. The star-shaped bore provides flow area for the fuel so that the fuel doesn't have to pass through the spring's coil. This reduces the flow restriction and therefore reduces the dead head pressure variation. The star-shaped bore also prevents the ball from "corking" in the event of a miss-build, whereby the pump was built without a spring.

In summary, in this invention a smaller ball provides for less flow restriction. With less flow restriction comes reduced pressure variation as the fuel flows passed the ball. Less buckling of the spring that seats the ball creates less force variation. With less force variation comes less cracking pressure variation. This combination creates a more uniform dead head pressure.

By using a smaller sealing ball than the seat coining diameter, an edge seal condition can be ensured. With an edge seal condition comes more consistent sealing diameter and therefore a more consistent cracking pressure. This further creates a more uniform dead head pressure.

Additional benefits and advantages of the present invention will become apparent to those skilled in the art to which this invention relates from the subsequent description of the preferred embodiment and the appended claims taken in conjunction with the accompanying drawings.

DETAILED DESCRIPTION OF THE PREFERRED EMBODIMENT

Figure 1:
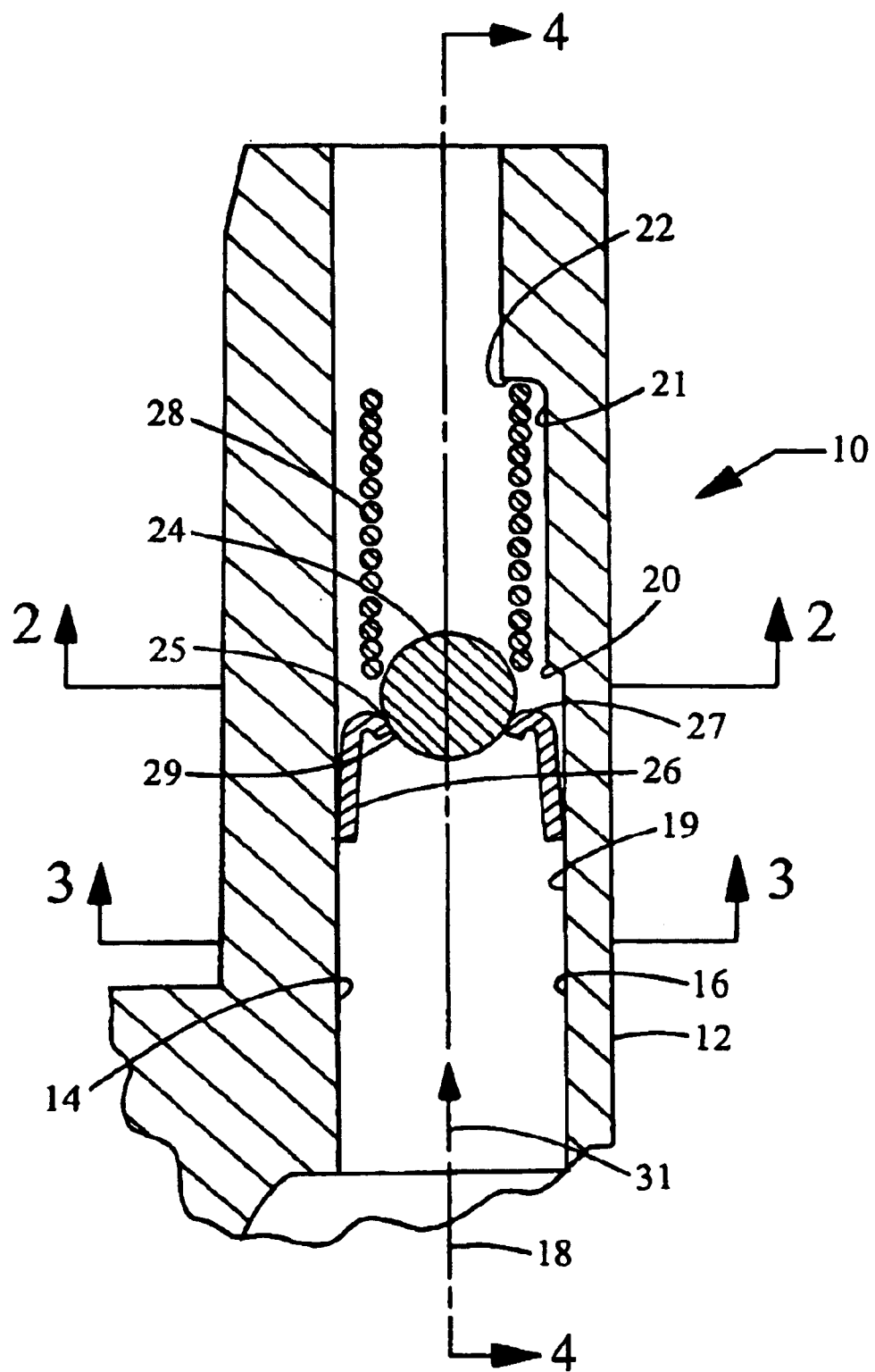
FIG. 1 is a cross-sectional view of the deviation pressure relief valve of the invention.
Figure 2:
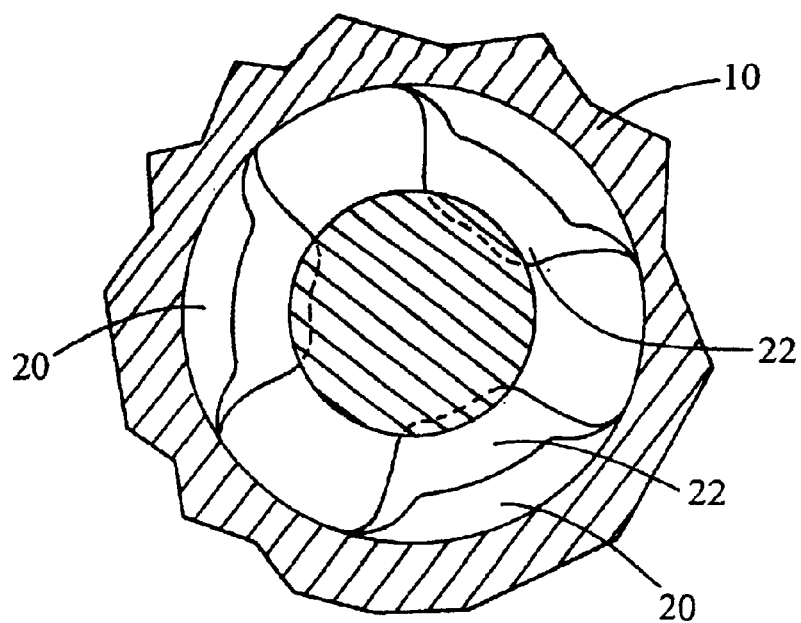
FIG. 2 is a cross-sectional view of the valve as seen from the line 2—2 in FIG. 1.
Figure 3:
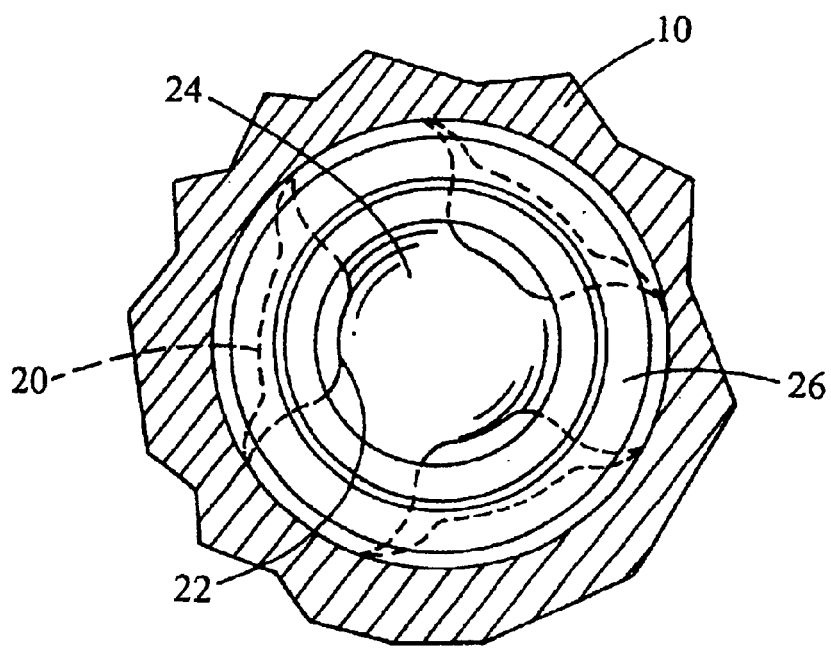
FIG. 3 is a cross-sectional view as seen from the line 3—3 in FIG. 1.
Figure 4:
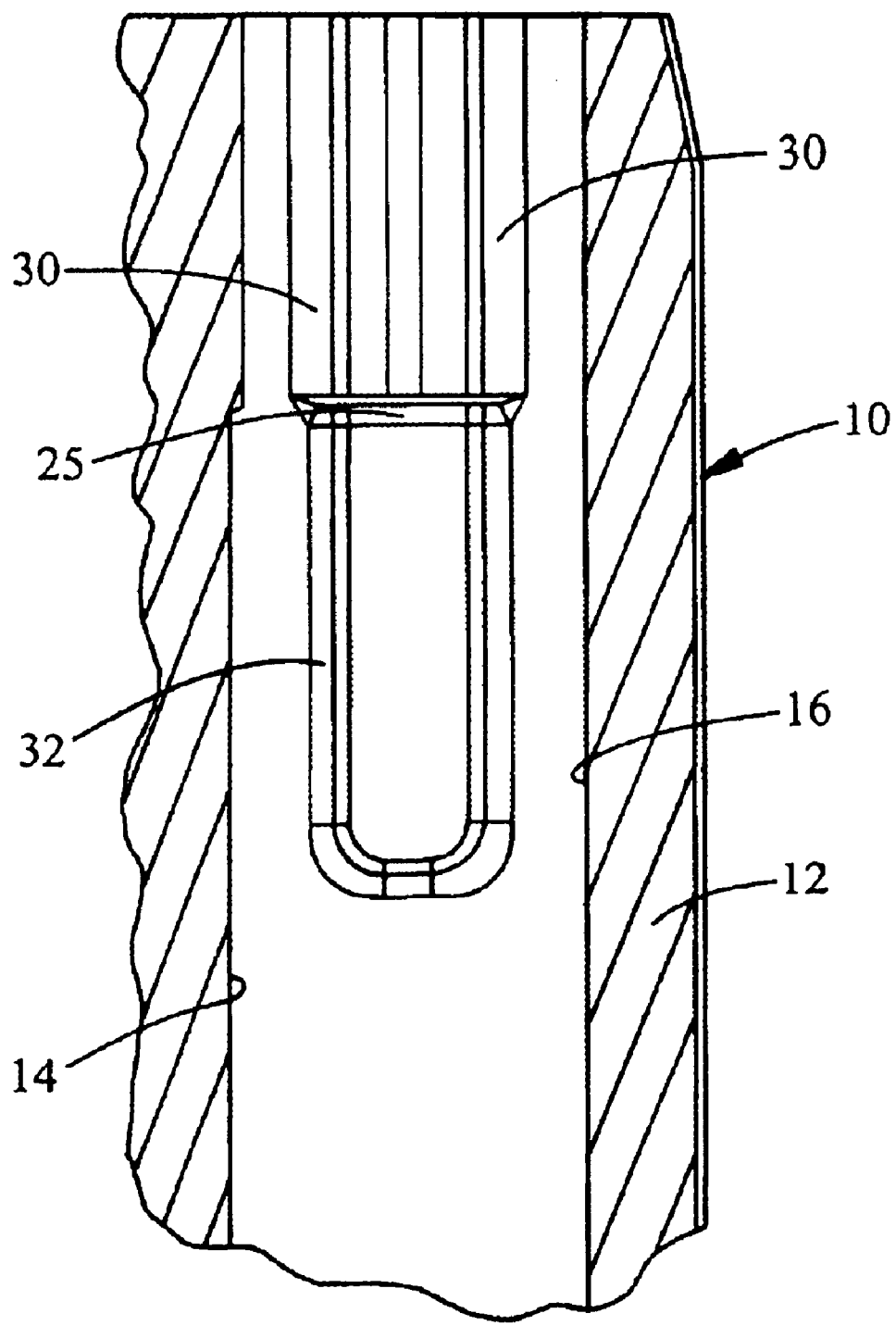
FIG. 4 is a cross-sectional view of the valve of this invention as seen from the line 4—4 in FIG. 1 without the spring, the ball, and the seat for the ball.

The low deviation pressure relief valve of this invention is shown generally at 10 in FIG. 1. The valve 10 comprises a housing 12 having a bore 14 defining a continuous wall 16. The bore 14 further defines a central axis 18 and the wall 16 is interrupted with passages 19 and 21 that respectively terminate in shoulders 20 and 22. The shoulders 20 and 22 are spaced apart along the axis 18 and, as shown in FIG. 2, there are three shoulders 20 and three shoulders 22 in this embodiment. As one skilled in the art will appreciate, a greater or lesser number of shoulders 20 and 22 may be used. The shoulders are equally spaced circumferentially, but would be alternatively spaced.

A ball 24 is located on the axis 18, the ball 24 being significantly less in diameter than the bore 14. A ball retainer 26 is press-fit or otherwise mounted in the bore 14 and supported on the housing 10. The retainer 26 in its form shown in FIG. 1 was in a pre-coining process from a tubular member (not shown). The coined retainer 26 has a reverse bent portion 27 at its downstream end to form a seat 25 for the ball 24. The seat 25 terminates in an edge 29 which seals with the ball 24. The shoulders 20 and 22 are located below or downstream the ball retainer 26.

A spring 28 coaxial with the axis 18 is located downstream from the ball 24 and supported on the shoulders 22. The ball 24 is therefore located between the spring 28 and the ball seat 25 so as to achieve low flow restriction and produce reduced pressure variation as fluid flows passed the ball 24 and to lessen the probability of buckling of the spring 28.

In use of the pressure relief valve 10, fuel flows through the bore 14 in the direction of the arrow 31 with enough pressure to move the ball 24 off the seat 25 with less flow restriction. With less flow restriction comes reduced pressure variation as the fuel flows passed the ball 24. The spring 28 being supported on the shoulders 22 is provided with a shorter free length that reduces buckling tendencies. This creates a more uniform dead head pressure. The seat 25 is defined by a reverse bend portion of the ball retainer 26 by the coining process with a sphere diameter larger than the diameter of the ball 24, and as such creates an edge seat condition that in turn creates a more consistent sealing diameter and therefore a more consistent cracking pressure for the valve 10. This creates a more uniform dead head pressure.

The guide ribs 30 prevent the spring 28 from buckling. The ribs also prevent the ball 24 from deviating from the centerline of the seat 25. This ensures more consistent sealing and prevents the ball 24 from becoming stuck off the seat. If the rib 30 is too long it will limit the axial movement of the ball 24 at higher open pressures. If the rib 32 is too short, then the ball 24 may move to the space between the retainer 26 and the rib 32 in the opening process and will not reseat itself.

The star-shaped bore 14 provides flow area for the fuel so that the fuel does not have to pass through the springs coils 28. This reduces the flow restriction and therefore reduces the dead head pressure variation. The star-shaped bore 14 also prevents the ball from "corking" in the event of a miss-build where the pump was built without a spring 28.

In an actual low deviation pressure relief valve described as set forth above, follows the design details. The flow resistance coefficient R=D (ball diameter)/C^3 (C=($D_{bore}$−$D_{ball}$)/2). The spring stiffness coefficient S=free length/pitch diameter.

The Pressure Relief Valve used in the fuel pump and/or fuel system consists of the following: 1) The flow existence coefficient R is in the range from 0.5 to 5, preferably 2.8; 2) A spring with spring stiffness coefficient S preferably in the range from 0.5 to 3.5, preferably 2.85; 3) The retainer has a larger coined diameter than the ball diameter; 4) Guide ribs are of a thickness, length, and profile in the PRV bore to centralize the ball and spring; 5) An outlet housing with a feature to allow fuel flow to bypass the spring to reduce flow restriction.

Additional benefits and advantages of the present invention will become apparent to those skilled in the art to which this invention relates from the subsequent description of the preferred embodiment and the appended claims taken in conjunction with the accompanying drawings. The foregoing discussion discloses and describes preferred embodiments of the invention. One skilled in the art will readily recognize from such discussion and from the accompanying drawings and claims that changes and modifications can be made to the invention without parting from the true spirit and fair scope of the invention as defined in the following claims. The invention has been described in an illustrative manner and it is to be understood that the terminology that has been used is intended to be in the nature of words and description rather than of limitation.

We claim:

1. A low deviation pressure relief valve for a fuel pump, said relief valve comprising:
   a housing having an elongated bore having a continuous wall, an axis, shoulders arranged on said wall so as to extend toward said axis,
   a ball in said housing having a diameter less than a the diameter of said bore,
   a ball retainer located in said bore upstream from said shoulders, said ball retainer having a pre-coined section and a coined section forming a ball seat, wherein said ball seat forms an edge seal condition with said ball, and wherein an inverted S-shaped reverse bent portion of said ball retainers forms said ball seat,
   a spring coaxial with said axis located downstream from said ball retainer and supported on said shoulders,
   said ball located between said spring and said ball seat, and
   guide ribs in said bore at a location coaxial with said spring and spaced around said axis.

2. The pressure relief valve according to claim 1 wherein said bore is a star shape to provide for flow of fluid around the spring to thereby reduce flow restriction.

3. The pressure relief valve of claim 2 wherein said bore allows fuel flow to by-pass the spring to reduce flow restriction.

4. The pressure relief valve of claim 1 in which said ribs prevent the ball from substantially deviating from the axis of the housing to thereby ensure more consistent sealing times and prevent the ball from being stuck off the seat.

5. The pressure relief valve of claim 1 wherein said ball diameter is smaller than a diameter of the pre-coined section.

6. The pressure relief valve of claim 1 wherein the flow resistance coefficient R is in the range of 0.5–5.0, the spring stiffness coefficient S is in the range from 0.5 to 3.50.

7. The pressure relief valve of claim 6 wherein said R is 2.8 and S is 2.85.

8. A low deviation pressure relief valve for a fuel pump, said relief valve comprising:
   a housing having an elongated bore having a continuous wall, an axis, shoulders arranged on said wall so as to extend toward said axis,
   a ball in said housing having a diameter less than a diameter of said bore,
   a ball retainer located in said bore upstream from said shoulders, the ball retainer having a straight section and a reverse bent portion forming a ball seat,
   a spring coaxial with said axis located downstream from said ball retainer and supported on said shoulders,
   said ball located between said spring and said ball seat,
   guide ribs in said bore at a location coaxial with said spring and spaced around said axis, and
   wherein the flow resistance coefficient R is in the range of 0.5 to 5.0 and the spring stiffness coefficient S is in the range from 0.5 to 3.50.

9. The pressure relief valve according to claim 8 wherein said bore is a star shape to provide for flow of fluid around the spring to thereby reduce flow restriction.

10. The pressure relief valve of claim 8 in which said ribs prevent the ball from deviating from the axis of the housing to thereby ensure more consistent sealing times and prevent the ball from being stuck off the seat.

11. The pressure relief valve of claim 8 wherein said ball diameter is smaller than a diameter of the straight section.

12. The pressure relief valve of claim 8 wherein said reverse bent portion is formed by formed by coining.

13. The pressure relief valve of claim 8 wherein said R is 2.8 and S is 2.85.

14. A low deviation pressure relief valve for a fuel pump, said relief valve comprising:
   a housing having an elongated bore having a continuous wall, an axis, shoulders arranged on said wall so as to extend toward said axis,
   a ball in said housing having a diameter less than a diameter of said bore,
   a ball retainer located in said bore upstream from said shoulders, said ball retainer having a pre-coined section and a coined section forming a ball seat,
   a spring coaxial with said axis located downstream from said ball retainer and supported on said shoulders,
   said ball located between said spring and said ball seat,
   guide ribs in said bore at a location coaxial with said spring and spaced around said axis, and
   wherein the flow resistance coefficient R is in the range of 0.5–5.0, and the spring stiffness coefficient S is in the range from 0.5 to 3.50.

15. The pressure relief valve of claim 14 wherein said R is 2.8 and S is 2.85.

16. The pressure relief valve of claim 14 wherein said ball diameter is smaller than a diameter of the pre-coined section.

* * * * *

UNITED STATES PATENT AND TRADEMARK OFFICE
CERTIFICATE OF CORRECTION

PATENT NO. : 6,840,270 B2
DATED : January 11, 2005
INVENTOR(S) : DeQuan Yu et al.

It is certified that error appears in the above-identified patent and that said Letters Patent is hereby corrected as shown below:

Title page,
Item [75], Inventor, delete "Lobombarbe," and substitute -- LaBombarbe, -- in its place.

Column 3,
Line 28, after "than a" delete "the".
Line 34, delete "S-shaped" and substitute -- J-shaped -- in its place.
Line 35, after "ball" delete "retainers" and substitute -- retainer -- in its place.

Column 4,
Line 29, delete "formed by" second occurrence.

Signed and Sealed this

Ninth Day of August, 2005

JON W. DUDAS
*Director of the United States Patent and Trademark Office*